Oct. 25, 1966  R. C. ANISFIELD  3,281,522
OUTLET BOX FOR RECESSED LIGHTING FIXTURE
Filed June 12, 1964
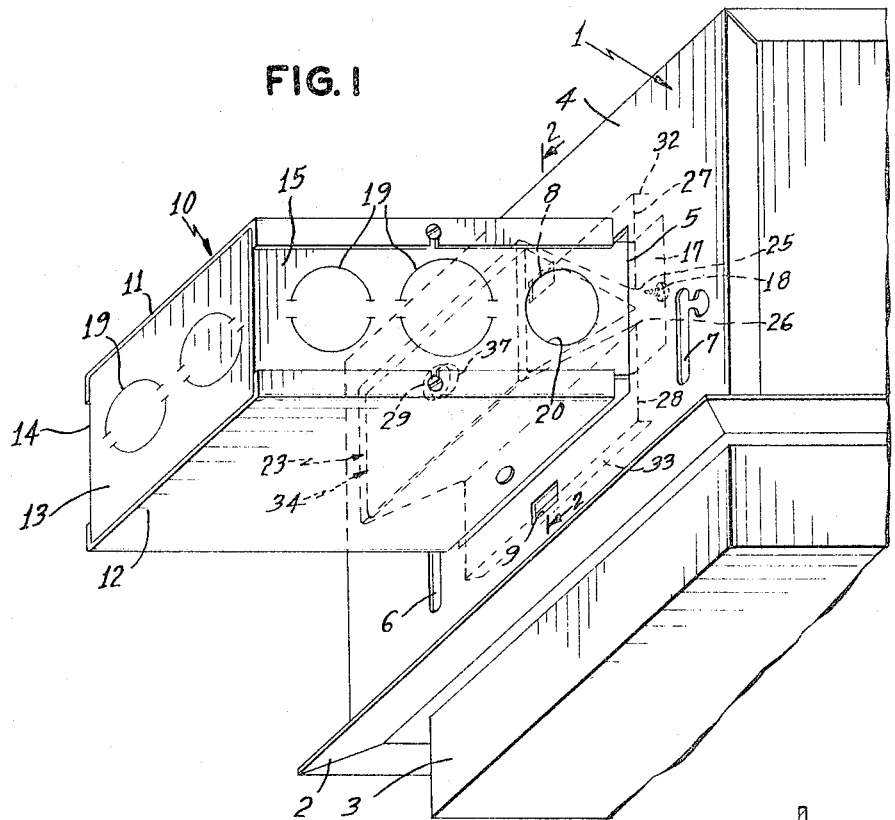
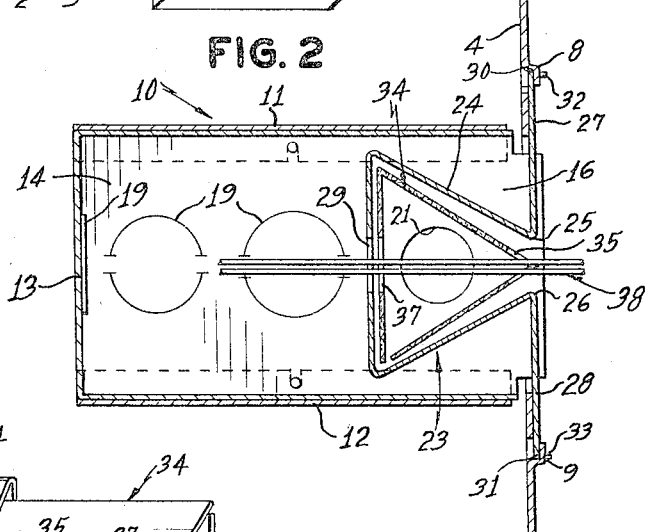
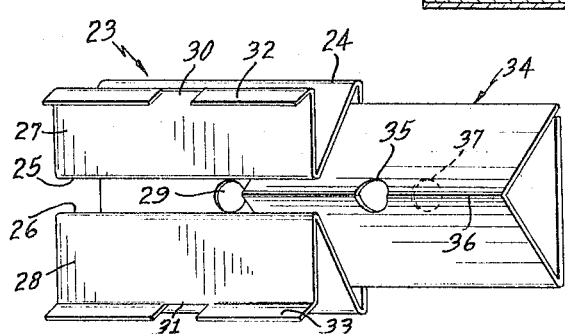
INVENTOR.
Richard C. Anisfield
BY
ATTORNEY 3,281,522
OUTLET BOX FOR RECESSED LIGHTING
FIXTURE
Richard C. Anisfield, 95 Yantacaw Brook Road,
Upper Montclair, N.J.
Filed June 12, 1964, Ser. No. 374,795
6 Claims. (Cl. 174—50)

The present invention deals with an outlet box for recessed lighting fixtures and more particularly with the combination of a recessed lighting fixture housing and an outlet box therefor.

In lighting fixtures of the recessed type whereby the fixture housing is recessed within a ceiling wall, such as a wall composed of removable ceiling panels, the recessing of the housing results in the contained fixture lamp developing considerable heat within the housing and such heat is transmitted to the outlet box. Such heat transmission is deleterious to the electrical wiring in the outlet box. One of the remedies for such a condition is to space the outlet box from the fixture housing utilizing some special heat insulation for the intermediate wiring. This is a somewhat cumbersome arrangement and detracts from the desirable preferred compactness of outlet box and housing as a unit.

The present invention overcomes heat transmission difficulties and provides a compact housing and outlet box combination assembly wherein the wiring in the outlet box is protected against overheating by means of a simple heat dissipator means removably mounted in the outlet box.

It is an object of the invention to provide a recessed lighting fixture housing and outlet box combination adapted to dissipate heat developed in the fixture housing.

It is another object of the invention to provide a recessed lighting fixture housing and outlet box combination wherein the outlet box is provided with a heat barrier-dissipator means to safeguard the outlet box wiring against overheating.

Other objects and advantages of the invention will become apparent from the description hereinafter following and the drawings forming a part hereof, in which:

FIGURE 1 illustrates an isometric view of a recessed lighting fixture housing and outlet box combination in accordance with the invention, FIGURE 2 illustrates a cross-sectional view along lines 2—2 of FIGURE 1, and FIGURE 3 illustrates an isometric exploded view of a heat barrier-dissipator unit according to the invention.

Regarding the figures, FIGURE 1 shows a portion of a recessed lighting fixture housing 1 of substantially rectangular shape having a top wall and side walls with a bottom having a peripheral flange 2 and a lens 3 closing the usual bottom opening. One of the side walls, e.g. side wall 4 is provided with a rectangular opening 5 and mounting apertures 6 and 7 on opposite sides of the opening 5. The wall 4 is also provided on its inner surface with tabs 8 and 9 above and below opening 5 provided by displacing e.g. by punching, portions of the wall 4 leaving the protruding tabs 8 and 9 having free ends thereof facing each other and spaced from the inner wall surface as illustrated in FIGURE 2. An outlet box 10 having a top wall 11, bottom wall 12, an end wall 13, and opposite side walls 14 and 15 are provided for mounting on the housing 1. The outlet box, therefore, has three side walls and an open side 16 for communication with the opening 5. The opposite side walls 14 and 15 extend outwardly of the open side 16 and terminate in flanges 17 at right angles to sides 14 and 15. In mounting the outlet box to the housing 1, the opposite side wall extensions including flanges 17 are inserted into opening 5 with the flanges 17 in abutment with the inner surfaces of housing wall 4 on opposite sides of the opening 5 and extending in opposite directions. The tabs 17 are affixed to the side 4 by means of metal screws 18. The sides 13, 14 and 15 are provided with the usual generally circular non-continuous scorings 19 which can be punched out of the walls for wiring access. The side walls 14 and 15 are provided with circular openings 20 and 21 in axial alignment with each other and positioned substantially adjacent the wall 4 of the housing 1.

Having mounted the outlet box on wall 4 as described above, there is provided a heat barrier-dissipator assembly 23 comprising a split triangular tube 24 of flexible material, such as flexible steel, having longitudinal split edges 25 and 26 spaced from each other, as particularly illustrated by FIGURE 3, with flanges 27 and 28 extending in opposite directions from the spaced longitudinal edges 25 and 26, respectively. Preferably, but not necessarily, the triangular tube is split along a longitudinal apex. With the tube being made of spring material or generally of resilient material, it is apparent that as the edges 25 and 26 are moved relative to each other under spring tension that the flanges also follow a corresponding movement relative to each other. An aperture 29 is formed through a wall of the tube which is opposite the spacing formed by the split edges 25 and 26. In mounting, the tube is inserted through the opening 5 of the housing 1 into the outlet box with the flanges 27 and 28 in abutment with the inner surface of wall 4. The flanges are urged toward each other under spring tension and the opposite flange edges 30 and 31 are positioned, respectively, between 8 and 9 and the inner surface of wall 4. Upon release from the urging of the flanges relative to each other, the resiliency of the tube causes the flanges to be locked by means of the tabs 8 and 9. A reverse procedure is used to remove the tube 24 from the outlet box. The flanges are preferably provided with angular skirts 32 and 33 notched substantially centrally thereof in order to prevent lateral movement of the tube within the housing or as a guide for centrally locating the tube within the outlet box. The tube 24 is a container for the heat barrier-dissipator member 34 herein contemplated. The heat barrier-dissipator member is formed from insulation material, such as a fibrous insulation material, e.g., paper, in the form of a tube 34 corresponding substantially with the shape of the tube 24. The insulation material may be formed from flat stock material and folded or otherwise formed into a tube configuration as illustrated by FIGURE 3. An aperture 35 is formed through the wall of the tube at the apex 36 and another aperture 37 is formed through the tube wall opposite the apex 36 and in line with aperture 35. Having so formed the tubular insulation material, the tube 34 is inserted into the split tube 24 with apex 36 adjacent the spacing between edges 25 and 26 and with the apertures 35 and 37 in alignment with split tube aperture 29. With the split tube 24 now loaded with the insulator tube 34, the assembly is mounted into the outlet box as described above. When so mounted, the open ends of the insulator tube communicate in alignment with the apertures 20 and 21 of the outlet box side walls 14 and 15 permitting air to circulate therebetween to dissipate the heat developed in the housing 1 and to prevent or retard the flow of heat into the outlet box rearwardly of the split tube 24. Since the insulation material itself acts as a heat barrier, the tubular construction acts as a dissipator through outlet box apertures 20 and 21 so that there is provided an effective heat barrier-dissipator means. The wiring 38 is shown only in part in FIGURE 2 to indicate the passage of the wiring from the outlet box 10 through the apertures 29, 37 and 35 in such order into the fixture housing.

While the split tube 24 and insulator 34 are shown as triangular tubes, obviously tubes of other configuration may be employed.

Various modifications of the invention are contemplated within the scope of the appended claims.

What is claimed is:

1. An outlet box for a recessed lighting fixture comprising an outlet box having a top wall, a bottom wall and side walls, one side of the outlet box being an open side, openings in opposite side walls adjacent the open side and in axial alignment with each other, a first open-ended tubular member positioned in the outlet box, a second open-ended tubular member positioned in the first tubular member with its opposite ends communicating with the side wall openings, wire passage means through the walls of the first and second tubular members, said first tubular member being split longitudinally thereof throughout its length forming longitudinal edges spaced from each other, flanges extending from the spaced edges in opposite directions and positioned outwardly of the open side, and the second tubular member being composed of an insulation material.

2. A recessed lighting fixture comprising in combination a housing member having side walls, an opening through a side wall of the housing member, an outlet box having a top wall, bottom wall and side walls, one side of the outlet box being an open side, the outlet box being secured to the housing member with the open side thereof communicating with the opening in the housing wall, openings in opposite side walls of the outlet box adjacent the open side and in axial alignment with each other, a first open-ended tubular member positioned in the outlet box, a second open-ended tubular member positioned in the first tubular member with its opposite ends communicating with the outlet box side wall openings, wire passage means through the walls of the first and second tubular members, said first tubular member being split longitudinally thereof forming longitudinal edges spaced from each other, flanges extending from the spaced edges in opposite directions and positioned outwardly of the open outlet box side, the flanges abutting the inner surface of the housing member side wall adjacent its opening.

3. A recessed lighting fixture according to claim 2, wherein the second tubular member is composed of an insulation material.

4. A recessed lighting fixture according to claim 3, comprising wiring passing from the outlet box into the housing member through the said wiring passage means.

5. A recessed lighting fixture according to claim 4, comprising lock means on the inner surface of the housing member side wall on opposite sides of the housing member side wall opening, the flanges of the first tubular member being engageable with the locking means.

6. A recessed lighting fixture according to claim 5, wherein the first and second tubular members are of triangular cross-section.

References Cited by the Examiner
UNITED STATES PATENTS

| | | | |
|---|---|---|---|
| 2,857,508 | 10/1958 | Klugman | 240—78 |
| 3,007,041 | 10/1961 | Matteson | 240—78 |
| 3,104,833 | 9/1963 | Stuart et al. | 174—52 |

LEWIS H. MYERS, *Primary Examiner.*

H. W. COLLINS, *Assistant Examiner.*